United States Patent [19]

Krieg et al.

[11] Patent Number: 4,935,309
[45] Date of Patent: Jun. 19, 1990

[54] MULTILAYER STRUCTURE

[75] Inventors: Michael Krieg, Tholen; Vladimir Kwiecinski, Halsteren; Wilhelmus J. L. A. Hamersma, Bergen op Zoom, all of Netherlands; Roger W. Avakian, Brasschaat, Belgium

[73] Assignee: General Electric Company, Pittsfield, Mass.

[21] Appl. No.: 192,287
[22] PCT Filed: Aug. 18, 1987
[86] PCT No.: PCT/NL87/00016
 § 371 Date: Jun. 20, 1988
 § 102(e) Date: Jun. 20, 1988
[87] PCT Pub. No.: WO88/01569
 PCT Pub. Date: Mar. 10, 1988

[30] Foreign Application Priority Data
Aug. 26, 1986 [NL] Netherlands .................. 8602159

[51] Int. Cl.$^5$ .............. C08L 67/00; B32B 27/08; B32B 27/36
[52] U.S. Cl. ................... 428/521; 428/500; 525/92
[58] Field of Search .............. 428/500, 521, 483; 525/92, 175, 176, 177

[56] References Cited

U.S. PATENT DOCUMENTS

| 3,644,574 | 2/1972 | Jackson | 525/175 |
| 4,563,381 | 1/1986 | Woodland | 428/483 |
| 4,684,578 | 8/1987 | Inoue | 428/483 |

FOREIGN PATENT DOCUMENTS

| 0042724 | 12/1981 | European Pat. Off. . |
| 0121883 | 10/1984 | European Pat. Off. . |
| 0128425 | 12/1984 | European Pat. Off. . |
| 2445223 | 7/1980 | France . |
| 2076832 | 5/1981 | United Kingdom . |

Primary Examiner—George F. Lesmes
Assistant Examiner—Elizabeth M. Cole
Attorney, Agent, or Firm—Bernard, Rothwell & Brown

[57] ABSTRACT

Structures built up from at least two layers one layer of which is built up from a polyalkylene phthalate ester film and one layer of which is built up from a polystyrene film.

5 Claims, No Drawings

MULTILAYER STRUCTURE

The invention relates to a multilayer structure comprising at least two layers with (a) at least one layer, comprising a polyalkylene phtalate ester film.

Multilayer structures comprising at least one layer comprising a polyalkylene phtalate ester film are general known.

FR-A-2445223 describes multilayer structures comprising one layer of a polybutyleneterephtalate and one layer of a rubber modified polystyrene, bonded together by a bonding layer consisting of a special type of block copolymer (example 4-12).

In manufacturing multilayer structures it is preferred to make structures not needing a special bonding layer.

EP-A-0121883 describes multilayer structures built up from several layers in which at least one layer consists substantially of a mixture of a poly(1,4-butylene-terephthalate) having an extraordinarily high intrinsic viscosity of more than 1.5 parts/g and an amorphous copolyester copolymer built up from 1,4-cyclohexanedimethanol units, optionally ethylene glycol units and terephthalic acid or a mixture of terephthalic acid and isophthalic acid. A second layer may consist of poly(alkylene terephthalates), polycarbonates, poly(arylsulphones), polyacrylates, polymethacrylates, polyurethanes, polyamides, polyimides, polyamideimides, polyesterimides, polyesteramides, thermoplastic polymers and the like. The second layer preferably consists of a polycarbonate. According to EP-A-0121883 the above-mentioned mixture consisting of polybutylene terephthalate and the amorphous copolyester copolymer has good barrier properties and it can readily be processed in extrusion-coinjection-blow moulding. It is stated in EP-A-0121883 that layers of the above-mentioned mixture can readily be bonded to layers substantially consisting of other thermoplastic materials without the use of extra bonding layers.

EP-A-0121883 therefore uses instead of a bonding layer a very special polyalkylene terephtalate based composition.

EP-A-0128425 describes multilayer structures comprising one PET base layer and one foamed polystyrene layer. It has been indicated that the PET layer can be laminated on the foam layer by thermal adhesion or through a bonding layer.

It has now been found that a polyalkylene terephtalate based film can be readily adhered onto a polystyrene or rubber modified polystyrene film without using a bonding layer.

The multilayer structure according to the invention can therefore be characterised in that it comprises besides the above mentioned layer (a) b) at least one layer substantially consisting of a polystyrene film or a rubber modified polystyrene film, the layers (a) and (b) being juxtaposed and being bonded together by thermal adhesion without using a bonding layer.

It is not an object of the invention to obtain rights for the structures which comprise a layer built up from a mixture of a polybutylene terephthalate having an intrinsic viscosity of more than 1.5 parts/g and an amorphous copolyester as described in EP-A-0121883.

It is possible to obtain a further improved bonding between the layers (a) and (b) when layer (a) consists of a film out of a polyalkylene phthalate ester which is mixed with a functionalised polystyrene.

(a) The layer comprising a polyalkylene phthalate ester film.

The structure according to the invention comprises at least one layer (a) as defined hereinbefore. Layer (a) consists of a film out of a material comprising more than 50% by weight, preferably more than 80% by weight, calculated with respect to the sum of all polymeric constituents, one or more polyalkylene phthalate esters, optionally in combination with a functionalised polystyrene.

Polyalkylene phthalate esters are compounds known per se. They are built up from units derived from one or more diols and one or more phthalic acids. Examples of suitable diols are ethanediol, butanediol, hexanediol, cyclohexanedimethanol, diethylene glycol, triethylene glycol and etherdiol compounds of the general formula $H-O-[(CH_2)_n-O]-_m H$. Suitable phthalic acids are terephthalic acid and isophthalic acid. As phthalic acids are particularly suitable terephthalic acid and isophthalic acid. A small quantity of, for example, up to 20 mol.% of the phthalic acid may be replaced by other dicarboxylic acids, for example, adipic acid.

The polyalkylene phthalate esters may be branched.

Particularly suitable in the structures according to the invention are the polyalkylene phthalate esters the alkylene units of which are derived for more than 80 mol.% from terephthalic acid. It is possible as such to use a polybutylene terephthalate having an intrinsic viscosity of less than 1.5 parts/g. Suitable are polybutylene terephthalate esters having an intrinsic viscosity of 0.7 to 2.0, preferably from 0.7–1.5 parts/g (measured in a 60/40 mixture of phenol/tetrachloroethane at 25° C.).

Layers constructed from the above-mentioned polyalkylene phthalate ester films have a good bonding to polystyrene film layers without the use of special intermediate layers of bonding material.

In those cases in which particularly high requirements are imposed upon the bonding, it is possible according to the invention to use a layer from a polyalkylene phthalate ester which is mixed with an agent to improve the bonding. As an agent to improve the bonding may be used in the structures according to the invention a functionalised polystyrene incorporated in the layer consisting substantially of the polyalkylene phthalate ester.

Functionalised polystyrene is to be understood to include polymers which comprise units derived from styrene or styrene derivatives and which also comprise units with reactive groups, i.e. groups which can enter into a physical ineraction with the polyalkylene phthalate ester. Examples of such groups are carboxylate groups or derivatives thereof, methacrylate groups, hydroxyl groups, epoxy groups, amine groups, oxazoline groups, sulphonate groups or derivatives thereof, nitrile groups, carbonate groups or derivatives thereof, amide groups and imide groups.

The units with reactive groups may be incorporated in the functionalised polystyrene in various manners, for example, in the form of random copolymers and block copolymers. Another manner consists in that the said units are grafted on a styrene polymer.

Suitable examples of functionalised polystyrene are the generally known styrene-maleic anhydride copolymers or the rubber-modified embodiments thereof and polystyrene on with reactive groups such as oxazoline groups. These products are commercially available: the first-mentioned as DYLARK ® from Messrs. ARCO, the second group as developmental polymer XUS- 40056.01 from Dow Chemical Company. Furthermore suitable are the polystyrenes with methacrylate or hydroxyl terminal groups (commercially available as CHEMLINK ® from the Sartomer Company).

The addition of S-MA to PET for improving the adhesive properties has been described in UK-A-2076832. EP-A-0205145 describes multilayer structures in which one layer comprised a polymer having reactive pendant cyclic imino ether groups and one adjecent layer comprises a polymer with groups coreactive with said cyclic imino ether groups. As such special copolymers having carboxyl groups, amino groups, amide group and the like are used.

The graft copolymers as described in US-A-3,786,116 are also suitable. These graft copolymers consist of a back bone which comprises ethylenically unsaturated monomers each having more than 1 vinylidene group (for example, alkyl esters of (meth)acrylic acid). Linear polymeric side chains in the form of polymers or copolymers having a molecular weight from 5,000 to 50,000 with more than one polymerisable moiety per (co)polymer chain are grafted on the said grafting base, said polymerisable moiety being present at the end of the chain. An example of such a side chain is a polystyrene chain with terminal vinyl groups.

The weight ratio of used functionalised polystyrene to polyalkylene phthalate ester preferably is between 0.01:1 and 0.1:1.

(b) The layer consisting substantially of polystyrene or a modified polystyrene

The structures according to the invention comprise at least one layer consisting substantially of polystyrene film or a rubber modified polystyrene film. "Consisting substantially of" is to be understood to mean that the material of which the layer in question consists, is built up from polystyrene or rubber modified polystyrene for more than 50% by weight, preferably more than 80% by weight, calculated with respect to the sum of all polymeric constituents.

Polystyrenes are to be understood to include polymeric compounds which comprise units derived from styrene or styrene derivatives such as alphamethyl styrene or halogenated styrene. These polymers may be modified with a rubber, for example a polybutadiene rubber (so-called high-impact polystyrene). The thickness of layer (a) usually is between 0.05 to 4.0 mm, that of layer (b) is between 0.05 and 10 mm.

The structures according to the invention may be built up from two or more layers. For example, the structure according to the invention may be built up from a layer consisting of a polyalkylene phthalate ester film and a juxtaposed layer bonded thereto and consisting substantially of polystyrene or a rubber modified polystyrene. A structure built up from three layers may consist, for example, of a central layer consisting of a polyalkylene phthalate ester film and two enveloping layers consisting substantially of polystyrene or a modified polystyrene films. It is also possible to combine the structure according to the invention with layers consisting substantially of other thermoplastic materials, for example, polycarbonate, polyvinyl chloride.

The structure according to the invention may be obtained according to a method generally known for such structures. For example, the structure can be obtained by laminating the individual layers obtained in a seperate extrusion step or also by coextrusion by means of a die specially suited for coextrusion. "Coinjection moulding" is also a suitable technique. Any desired article can be manufactured from the structure according to the invention, for example, by cold deformation, thermal deformation, blow moulding, and the like. The adhesion between the different film layers is thereby obtained by bonding them together at elevated temperature, possibly in combination with pressure.

The structure according to the invention is suitable for example, to manufacture therefrom packaging materials in the form of holders, cups, and the like.

In the manufacture of the structures according to the invention or in the manufacture of articles therefrom, a considerable quantity of waste material may occur. This waste material may be ground, a mixture of the various materials which are present in the structure according to the invention being formed. Articles can be manufactured from these mixtures by injection moulding. It is another object of the invention to also obtain exclusive rights for these mixtures.

The composition of these mixtures depends on the structure according to the invention from which they have been obtained. In general, these mixtures comprise 5–95% by weight of polyalkylene phthalate ester and 95–5% by weight of polystyrene or a modified polystyrene, calculated with respect to the quantity of polyalkylene phthalate ester plus (modified) polystyrene. A functionalised polystyrene may also be present in the mixtures.

The invention will now be described in greater detail with reference to the ensuing specific examples.

EXAMPLE I

Several different films were manufactured having a composition as indicated hereinafter (TABLE A). The films were prepared by pressing the materials in a mould (dimension of the pressed layers: 180×50×0.65 mmm). The materials were first heated in the mould to just below their softening point and were kept at that temperature for 30 seconds. The material was then brought under a pressure of 25 kN for minutes. The films were then cooled in air.

TABLE A

| Film No. | Composition (% by weight) |
|---|---|
| 1 | High-impact polystyrene (having 9.5% by weight of rubber and 20–25% by weight of gel fraction). |
| 2 | Polybutylene terephthalate (PBT) (intrinsic viscosity 1.18 parts/g. |
| 3 | 80% by weight of PBT + 20% by weight of high-impact polystyrene. |
| 4 | 80% by weight of PBT + 20% by weight of polystyrene functionalised with oxazoline. |
| 5 | 80% by weight of PBT + 20% by weight of rubber-modified styrene-maleic anhydride copolymer (DYLARK ® 250). |
| 6 | 50% by weight of PBT + 50% by weight of DYLARK ® 250. |

Various structures, each consisting of one film I and one of the films 2 to 6 inclusive were manufactured from the layers thus obtained.

The structures were manufactured by pressing the films one on the other at 250° C. for 2 minutes under a pressure of 25 kN.

The mutual bonding strength of the layers in the resulting two-layer structures was determined as follows. The two film layers were separated from each other mechanically (by means of a knife) over a length of 40 mm. The ends obtained were each bent at an angle of approximately 90° with the two-layer structure and clamped in a drawing machine. The layers were pulled apart at a pulling rate of 5 mm/min.

The force occurring when the two layers detached (fracture) was determined. The found values are recorded in TABLE B.

TABLE B

| Structure built up from layer Nos. | Force when the layers detached (N) |
|---|---|
| 2 & 1 | 4 |
| 3 & 1 | 1.3 |
| 4 & 1 | 12.8 |
| 5 & 1 | 12.5 |
| 6 & 1 | 24 |

It may be seen from the results of TABLE B that the laminate according to the invention has a good bonding between the various layers, even in case of the combination of film layer 1 with film layer 2 or 3. A further improvement in bonding strength is obtained by using film layers comprising a functionalized polystyrene, in particular the laminates with a layer 4, 5 or 6.

EXAMPLE II

Two structures, each built up from a layer of high-impact polystyrene film having a rubber content of 8-10% by weight and a gel fraction of 20-25% by weight and a layer of polybutylene terephthalate film (PBT having an intrinsic viscosity of 1.10 parts/g) were manufactured by coextrusion in a Reifenhäuser extruder. In the first case the layer consisted of pure PBT film; in the second case it consisted of a film out of a mixture of 90% by weight of PBT and 10% by weight of DYLARK ®250 (as used in Example I*).

In the coextrusion in a Reifenhäuser extruder the PBT/DYLARK mixture was prepared directly in the coextruder. The high-impact polystyrene was supplied through the main extruder.

A procedure similar to that as described in Example I was followed for determining the bonding strength between the layers: the layers were separated from each other mechanically over a certain length. The end of one of the two layers was bent back over an angle of approximately 180°. The ends of the detached layers were clamped in a drawing machine. The force occurring when the two layers detached (fracture) was determined. The found values are recorded in TABLE C.

TABLE C

| Structure | Force when the layers detached (N) |
|---|---|
| • high-impact polystyrene/PBT | 0.3 |
| • high-impact polystyrene/PBT + DYLARK ® 250 | >35 |

It may also be seen from TABLE C that bonding occurs already in structures with layers consisting of (high-impact) polystyrene and PBT. This bonding may be considerably improved by using a polymer mixture which comprises a functionalised polystyrene.

EXAMPLE III

In the same manner as described in Example I, three film layers were manufactured from:

(a) a mixture of 80 parts by weight of polyethylene terephthalate (=PET having an intrinsic viscosity of 0.70 parts/g measured in a 60/40 mixture of phenol and tetrachloroethane at 30° C.) and 20 parts by weight of high-impact polystyrene.

(b) a mixture of 80 parts by weight of the same PET and 20 parts by weight of DYLARK ®250.

(c) high-impact polystyrene.

The same product as was used in Example I was used as a high-impact polystyrene. The layers were compressed at 250° C. Two multilayer structures were manufactured: the first from a film layer of PET +HIPS in combination with a film layer of HIPS; the second from a film layer of PET+DYLARK ®250 in combination with a film layer of HIPS. The said layers were pressed one on the other at a temperature of 250° C.

The bonding strength was determined in the same manner as in Example I. The results are recorded in TABLE D.

TABLE D

| Structure built up from | Force when the layers detached (N) |
|---|---|
| PET + HIPS film and HIPS film | 11.0 |
| PET + DYLARK ® 250 film and HIPS film | 14.5 |

We claim:

1. A multi-layer laminate structure comprising
(a) a layer comprising a polybutylene terephthalate film wherein said polybutylene terephthalate has a intrinsic viscosity of less than 1.5 parts/g. and
(b) a layer comprising 50% by weight of polystyrene film or rubber-modified polystyrene film, wherein layers (a) and (b) are juxtaposed and thermally bonded together without a bonding layer therebetween.

2. The structure as claimed in claim 1 wherein said layer film consists essentially of a band of polybutylene terephthalate and functionalized polystyrene.

3. The structure as claimed in claim 1 wherein said polybutylene terephthalate is based on a butylene component having at least 80 mol% of units derived from 1,4-butane glycol and a phthalate component having at least 80 mol% of units derived from terephthalic acid.

4. A structure as claimed in claim 2 wherein said functionalized polystyrene is a styrene-maleic acid copolymer.

5. A structure as claimed in claim 2 wherein said functionalized polystyrene includes oxazoline groups.

* * * * *